United States Patent
Felemban et al.

(10) Patent No.: US 10,827,410 B2
(45) Date of Patent: Nov. 3, 2020

(54) SYSTEM, APPARATUS AND METHOD FOR ROBUST TRANSMISSION OF VISUAL DATA THROUGH VISUAL SENSOR NETWORK

(71) Applicant: Emad Abdulrazzak Felemban, Makkah (SA)

(72) Inventors: Emad Abdulrazzak Felemban, Makkah (SA); Adil Amjad Ashraf Sheikh, Makkah (SA); Saleh Muhammed Basalamah, Makkah (SA)

(73) Assignees: Umm-Al-Qura University, Makkah (SA); Unit of Science and Technology, Institute for Research and Revival of Islamic Heritage, Makkah (SA)

( * ) Notice: Subject to any disclaimer, the term of this patent is extended or adjusted under 35 U.S.C. 154(b) by 611 days.

(21) Appl. No.: 14/596,178

(22) PCT Filed: Apr. 1, 2014

(86) PCT No.: PCT/IB2014/001255
§ 371 (c)(1),
(2) Date: Jan. 13, 2015

(87) PCT Pub. No.: WO2015/150853
PCT Pub. Date: Oct. 8, 2015

(65) Prior Publication Data
US 2017/0013533 A1    Jan. 12, 2017

(51) Int. Cl.
*H04W 40/00*  (2009.01)
*H04W 4/70*  (2018.01)
*H04L 12/64*  (2006.01)
*H04W 74/08*  (2009.01)
*H04W 84/18*  (2009.01)

(52) U.S. Cl.
CPC ......... *H04W 40/00* (2013.01); *H04L 12/6418* (2013.01); *H04W 4/70* (2018.02); *H04W 74/0808* (2013.01); *H04W 84/18* (2013.01)

(58) Field of Classification Search
CPC .. H04L 12/6418; H04W 40/00; H04W 4/005; H04W 4/70; H04W 74/0808; H04W 84/18
See application file for complete search history.

(56) References Cited

U.S. PATENT DOCUMENTS

| | | | | |
|---|---|---|---|---|
| 2004/0008894 | A1* | 1/2004 | Zeineh | G06T 9/007 382/240 |
| 2007/0104215 | A1* | 5/2007 | Wang | H04L 47/24 370/458 |
| 2013/0339482 | A1* | 12/2013 | Yoshimoto | H04L 1/004 709/217 |

* cited by examiner

*Primary Examiner* — Kashif Siddiqui
(74) *Attorney, Agent, or Firm* — Geeta Kadambi; Riddhi IP LLC

(57) ABSTRACT

The present invention is related to a method for routing image data from Camera Node to a Sink Node, where it May be processed in detail, in a Visual sensor network. In accordance with the present invention, wireless Intermediate Node are configured to route images based on first pass image encoding containing coarse image to the next wireless hop at a higher priority over the images based on the second pass encoding containing additional details of the images. The routing method for wireless Ad Hoc mobile and sensor network, periodically exchanges node status information to optimize the routing table, so that high priority image packets may reach the Sink Node in shortest possible path. The method ensures selection of high quality image packets for routing under the condition of collision and congestion to achieve optimal image quality receipt at the Sink Node.

8 Claims, 12 Drawing Sheets

SYSTEM, APPARATUS AND METHOD FOR ROBUST TRANSMISSION OF VISUAL DATA THROUGH VISUAL SENSOR NETWORK

CROSS REFERENCE TO RELATED APPLICATION

The instant application claims priority to PCT/IB2014/001255, filed on Apr. 1, 2014. The pending PCT application is hereby incorporated by reference in its entireties for all of its teachings.

FIELD OF TECHNOLOGY

The present invention relates to a system, apparatus and method for transmitting visual data through visual sensor network (VSN). More specifically VSN is used for transferring visual data from the camera sensor node through the Intermediate Node to a Sink Node using an Ad Hoc wireless, mobile and/or sensor network configuration.

BACKGROUND

Presently, some of the Camera Node that produce images are connected to a router directly using a wire. The router in turn is connected to a "wired" network and finds a way to transfer the collected visual packets to the Sink Node. This works well in cases where there is a "wired" infrastructure. However, not all the places have such a facility. For example, when the Camera Nodes are in remote areas, it is difficult to find connectivity to the network through wired means.

Camera Node that are present in remote areas where there is no connectivity to data network, have difficulty in transferring information to the Sink Node. In those cases, a Camera Node connected over a wireless medium will be able to transfer its packets to the nearest node. For the complete information to get transferred, the wireless node needs to have a large bandwidth connectivity, which may not be technologically possible, or extremely expensive. Hence a smart way to achieve the transfer of information to the Sink Node would be extremely useful.

If the Camera Node is moving, or the Intermediate Node are moving, then it becomes quite challenging to transfer information collected in Camera Node to the Sink Node without risks of losing a portion of the information due to congestion or loss of links. Therefore an intelligent mechanism to order the packets need to be found where partial receipt of information may still provide useful sequence of video at Sink Node for reconstruction. The challenge here is, how partial or granular can the video be for it to be useful? If it is too less, the data is useless, and if it is too much, there is a chance of losing it during the transit.

Once the packets are transferred in a granular manner to Intermediate Node, how does the packet find its way to the Sink Node in an optimal fashion? This question is challenging, especially when the Intermediate Nodemay move freely into the cloud or go outside the cloud. Therefore, a mechanism that would constantly check the pulse of the network and update the paths is very necessary. Presently, routing protocols do exist for wired and wireless networks that can communicate between nodes to figure out a routing table. However, these protocols may end up being a drawback especially in a Visual sensing network, where all packets are moving in one direction, i.e., from Camera Node to Sink Node. There is a need to address the above mentioned deficiencies and come up with a seamless method to process visual data.

SUMMARY

In the present disclosure a novel system, apparatus and method for robust transmission of visual data using visual sensor network using wireless Ad Hoc, mobile and/or sensor network is disclosed. In one embodiment, visual sensor network system comprises of a visual sensor node such as a Camera Node, Intermediate Node and Sink Node. The nodes may be connected using wireless Ad Hoc network, mobile network and/or sensor network. In another embodiment, the network may be used independently or in combination as part of other visual sensor network.

In one embodiment, the visual sensor network method comprises of transferring data from several nodes such as a visual sensing node that may be a Camera Node, Intermediate Node and a Sink Node. In one embodiment an image is captured by the visual sensing node (may be Camera Node) and transmitted using Intermediate Node to the Sink Node. In another embodiment, the decomposition of an image in the Camera Node is done by layering and compressing the image that is consistent, valid and useful. In one embodiment, using the Intermediate Node, prioritization of the data package of the captured, layered and compressed data is done. In another embodiment, a routing methodology in the Intermediate Node in visual sensor network to carry prioritized compressed visual data traffic from Camera Node to the Sink Node is done optimally based on traffic conditions and topology.

A visual sensor network may consist of a visual sensing node such as Camera Node, Intermediate Node, and Sink Node. In one embodiment, an apparatus for transmitting a packet from a visual sensor node, such as Camera Node, is provided to reach Sink Node in an optimal fashion satisfying the specific constraints. In another embodiment, an optimal routing method and process for transferring visual data from the Camera Node through the Intermediate Node to a Sink Node in a visual sensor network is disclosed.

In one embodiment, a system and method to conduct image capturing, image transferring, image prioritization, layered image compression, routing priority rules, routing process, and forwarding method are disclosed. In one embodiment, a method and system to discover a control path for the image data to travel from Camera Node to the Sink Node through Intermediate Node is described. In another embodiment, an optimal path is provided by the control layer between every Camera Node to the Sink Node via Intermediate Node. In another embodiment, the control path is calculated using control messages sent between the node (Camera Node, Intermediate Node and Sink Node).

The method of processing an image, in one embodiment, starts by capturing the image, layered compression of the image, decomposing the image, prioritizing the package, finding an optimal path for the package, and transmitting the package using Camera Node, Intermediate Node and Sink Node in a wireless setting, Ad Hoc wireless setting or regular network setting.

In one embodiment, a system may comprise of a media access layer, routing layer, and a application layer residing in a hardware such as a chip, computer, network hardware etc.

Other features will be apparent from the accompanying figures and from the detailed description that follows.

BRIEF DESCRIPTION OF THE DRAWINGS

Example embodiments are illustrated by way of example and no limitation in the graph and in the accompanying figures, like references indicate similar elements and in which.

Other features of the present embodiments will be apparent from the accompanying detailed description that follows.

DETAILED DESCRIPTION

The present invention relates to a system, apparatus and method for transmitting visual data through visual sensor network. More specifically for transferring visual data from camera sensor node through the Intermediate Node to a Sink Node in a wireless Ad Hoc, mobile and sensor network configuration. The present disclosure also relates to an apparatus to communicate image optimally from Camera Node in the access side of the Visual sensor network to the processing node, namely Sink Node, encompassing innovative routing and forwarding method and software in the hardware at Camera Node, Intermediate Node and Sink Node.

Wireless Network: The present disclosure relates to wireless network, where a set of autonomous nodes are connected through wireless links. The wireless network may comprise of mobile and Ad Hoc network. The assumption is that every autonomous node (Camera Node, Intermediate Node and Sink Node) has a radio RF card inside it that provides Transmit (TX) and Receive (RX) functionality to communicate data between neighboring autonomous node. The forwarding layer within the autonomous node decides the next hop of the packet, in other words it decides which neighboring autonomous node to transfer the packet. The forwarding layer also decides what to do with the received packet. The routing layer decides the routing table depending on the topology or connectivity of the network.

Wireless Sensor Network: A wireless sensor network comprises of a set of sensors or sensor node connected together. A wireless sensor network is a wireless network (as defined above) where at least one autonomous node is a sensor node.

Visual sensor network: A visual sensor network is a wireless sensor network (as defined above) where at least one autonomous node has visual sensor equipment such as camera. An autonomous node that has a sensor is known as a sensor node. A sensor node that has one or more cameras is also known as Camera Node or Visual Sensing Node. In one embodiment, Visual sensor network consists of Camera Node that capture the image, Intermediate Node that receive the image from Camera Node and transfer to the neighboring node, and the Sink Node that ultimately receives the captured image that is processed and reconstructed. In another embodiment, the wireless network comprises of various sensor nodes. Sensor node includes Visual sensing node such as Camera Node. It also illustrates Intermediate Node that carry traffic from the visual sensing node to the ultimate processing node and a Sink Node that processes the information collected by the entire visual sensing node.

Figure 1:
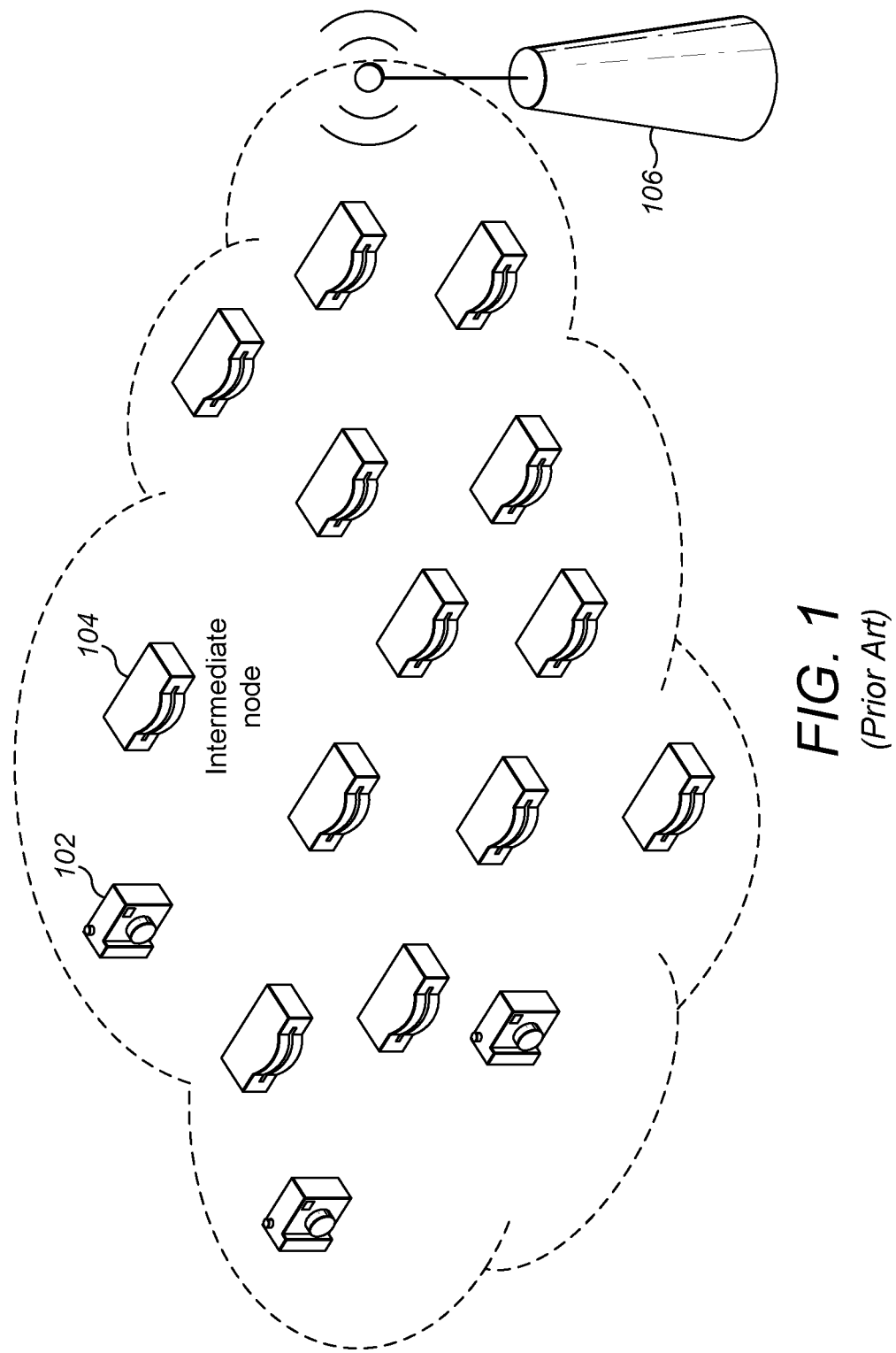
FIG. 1 shows the Prior Art version of the different node present in a typical Visual sensor network (VSN).

FIG. 1 illustrates the Visual sensor network (VSN) of types of node in a typical VSN (prior art). A typical VSN has a static Visual sensing node 102, a static Intermediate Node 104 and a static Sink Node 106 connected over a wireless link. The entire sensor node, in this configuration, collects information.

Figure 2:
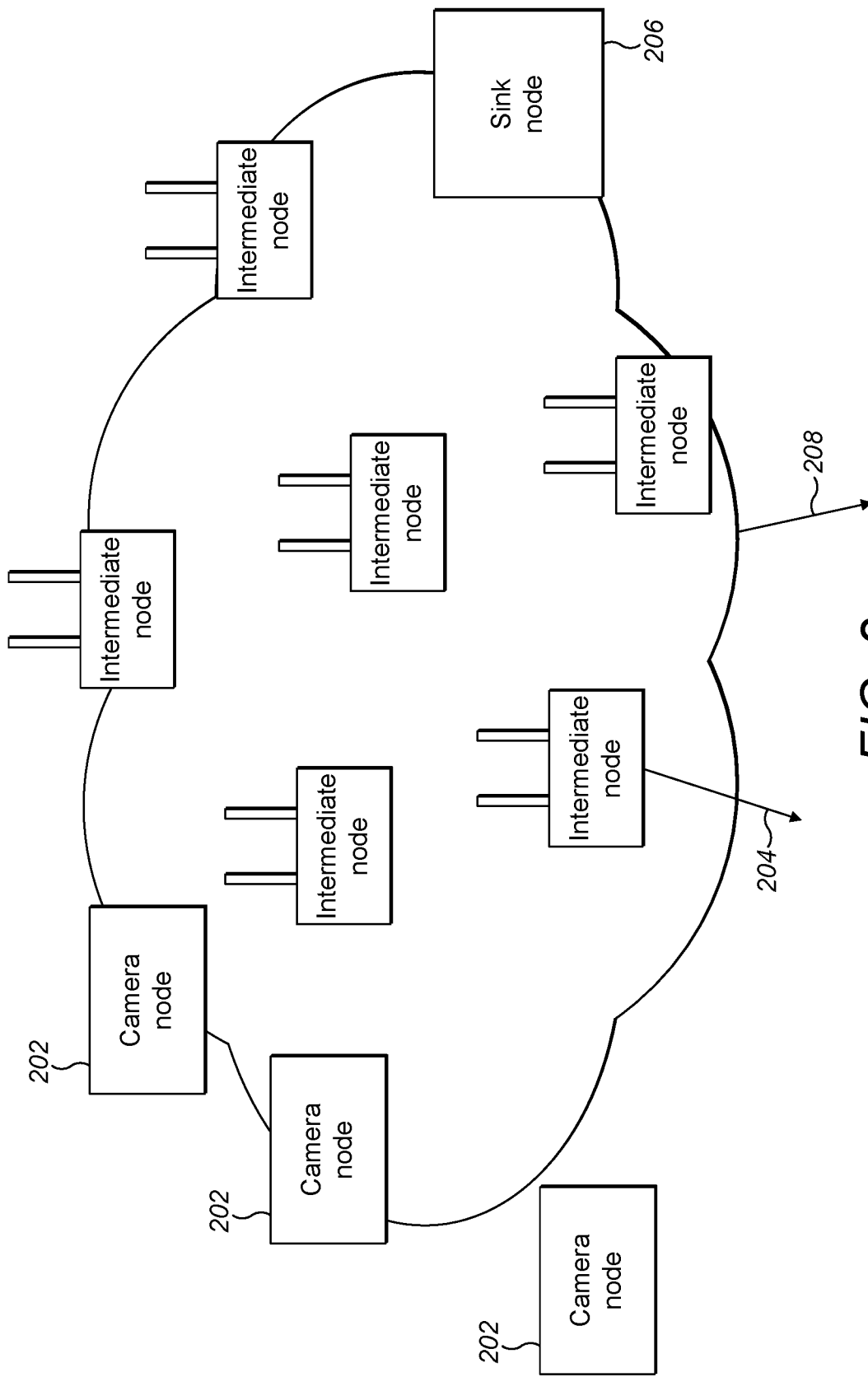
FIG. 2 shows a configuration for Wireless Visual Sensor Ad Hoc cloud having a group of node.

FIG. 2 shows the Visual sensor network 208 that is pertinent to the instant disclosure. Dynamic Camera Node 202, dynamic Intermediate Node 204 and the dynamic Sink Node 206 may be part of the network or briefly go out of the network when there is no connectivity. The entire sets of nodes are dynamic nodes that may move into or move out of the network.

A Camera Node 202 collects visual information through cameras and packetizes the information. All Camera Nodes are ingresses to information into visual sensor network and hence are called sensor access nodes. A Camera Node is a sensor access node, since it is in access side of network collecting information. Camera Node 202, Intermediate Node 204, and the Sink Node 206 are the constituents of the network 208. It should be noted that in a wireless Ad Hoc network, nodes move around and hence for example an Intermediate Node 204 could go "incommunicado" and leave the network. FIG. 2 depicts a typical Wireless Visual Sensor Ad Hoc cloud consisting of a group of node.

Intermediate Node: Intermediate Node 204 in a visual sensor network is that node that route the packets, created by the Camera Node, towards the Sink Node. Intermediate Node receives packets from Camera Node and routes it to another Intermediate Node or to a Sink Node if it has direct connectivity.

Sink Node: An autonomous node that is not a sensor access node, and processes the information captured by one or more Camera Node into a meaningful sequence of information is known as a Sink Node 206. A Sink Node is the final destination, within the visual sensor network, of the information captured by the entire sensor access node.

Figure 3:
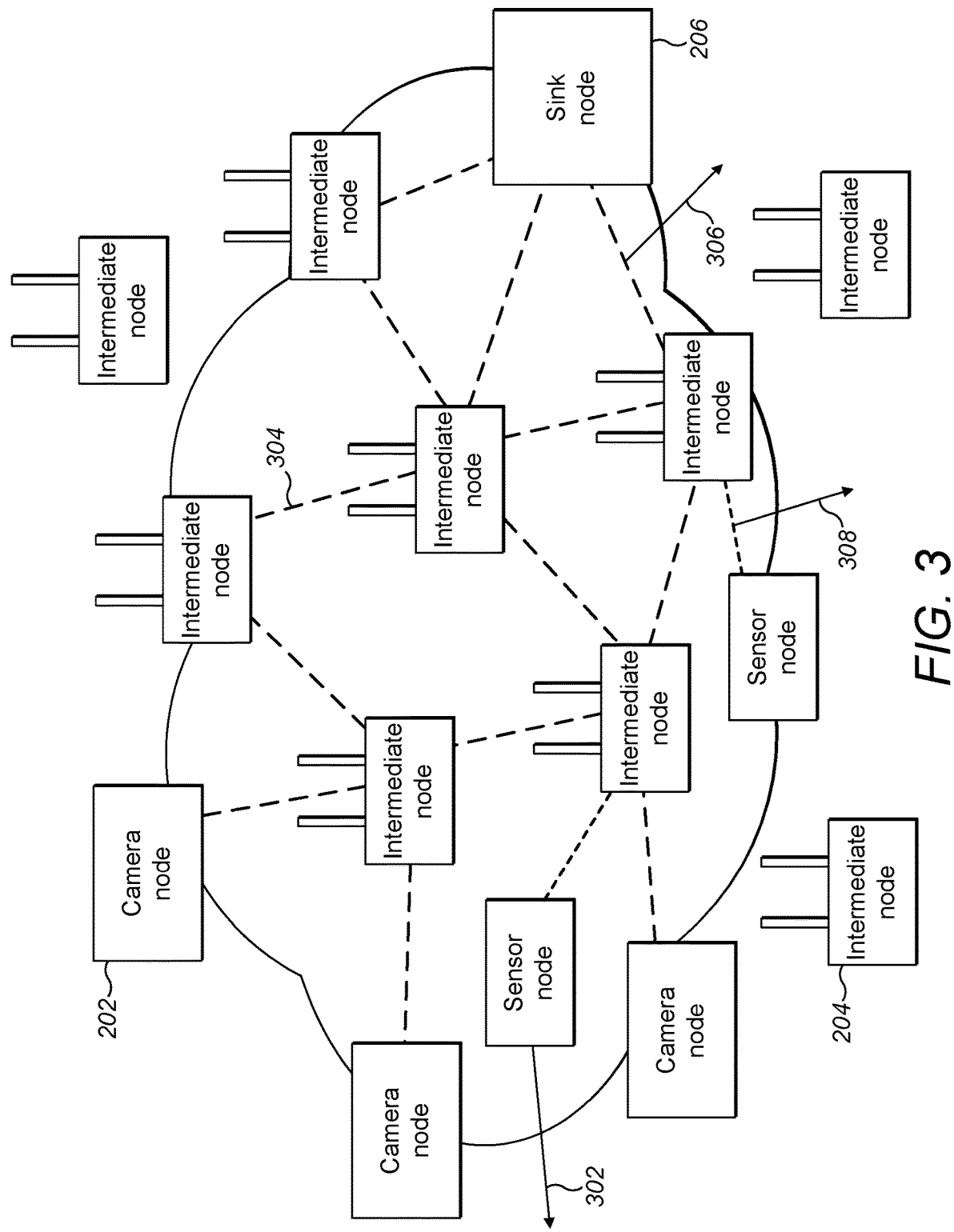
FIG. 3 shows the wireless visual sensor network components and the line between various nodes indicates a possible connection or communication between the various nodes.

In a wireless network, there could be other Sensor node 302, other than Camera Node 202. Camera Node is a special type of Sensor node that collect visual data from Cameras. Other type of Sensor node could collect data such as wind speed, temperature and pressure. The node may be classified into three distinct sets, namely Sensor node 302 (Example: Camera Node 202), Intermediate Node 204 and the Sink Node 206, according to one embodiment of the present invention. The wireless visual sensor ad-hoc network is formed by a collection of the nodes that are within reach of each other and communicate. The interconnectivity diagram shown in FIG. 3 is the topology where the line between two nodes 308 indicates a possible connection or communication between two nodes. There are nodes, such as Intermediate Node 304, that are outside the cloud and not part of the topology since they do not have connectivity to at least one other node within the topology. The link between a Sensor node and Intermediate Node is formed when Sensor node realizes based on the advertisement from Intermediate Node that it provides the shortest path to a Sink Node 206?. Similarly, when a Sink Node communicates to all its neighboring Intermediate Node to broadcast its existence, a link 306 between Intermediate Node and a Sink Node is formed. The same is true with respect to connectivity between two Intermediate Nodes 304. The precise mechanism for forming this network is described as part of the invention. It may also be seen that an Intermediate Node 204 that was part of the network earlier, may leave the network and become unreachable. It may become reachable in future to become part of the network topology as well.

FIG. 3 shows wireless visual sensor network showing the components and connectivity. The Ad Hoc Network innovation is to maintain the consistency of the optimal path between Camera Node to the Sink Node through Intermediate Node when some of the nodes dynamically enter into the network, and some others leave.

Camera sensors image priorities: Various Camera Nodes in the visual sensor network capture images that need to be transferred from the Camera Node through Intermediate Node to the Sink Node for processing. The image sequence coming from the Camera Node are quite large and it may not be possible to carry forward all the images from all the Camera Node through Intermediate Node to Sink Node, as there may not be enough capacity to carry that traffic through. General image compression algorithms though compress the images; still have quite a large amount of data to be transferred for processing. Therefore a category of compression algorithm that generates multiple layers of compressed image data is used. The first layer, contain the most prominent features of the image. The subsequent layer contain the details that when merged with the first layer, restore the original image. The invention optimizes the usefulness of the image data captured by the Camera Node, by optimally packetizing and prioritizing the data to be carried to the Sink Node through a network of Intermediate Nodes.

Intermediate Node: The present invention provides an apparatus to carry forward the layers of compressed images, packetized as data, from Camera Node to the Sink Node through the Intermediate Node. In the best of conditions, the apparatus provides the method to carry all the data through Intermediate Nodes if there are enough nodes, connectivity and capacity. However, the number of Intermediate Nodes and the connectivity is not known apriori as in the Ad Hoc mobile wireless networks, nodes join the network when they are in proximity of an autonomous node belonging to the network, and the node leave the network when they move away from the connectivity region of an autonomous node within the network. This situation leads to the invention, where the proposed routing method within the apparatus in Intermediate Node make decisions to optimize based on constraints, which packets to carry and which ones to be dropped. The transfer through Intermediate Node has routing layer and forwarding layer functionalities.

The Forwarding path, novel to this disclosure, is related to the transmission of the images from the Camera Node to the Sink Node. The decomposition of images in the Camera Node is based on importance of images. The most important features of the image are packetized separately compared to incremental features when the packets travel through the network. The forwarding layer in all the nodes transmit the packet with important features first and only when no important feature is available for transmission does it transfer the incremental features, thus enabling the Sink Node to have the optimal amount of important features to create a sequence.

Routing method optimization goal: The routing method in the Intermediate Node within the present proposed apparatus handles the optimization of transferring high priority packets between nodes so the image packets from Camera Node reach the Sink Node. The routing method maximizes the transfer of high priority first pass image encoded packets, arriving at the Intermediate Node, from Camera Node to Sink Node subject to the following two conditions: that image encoding compression with multiple layers is done and the sink layer has optimal processing available to handle the arriving image packets.

Routing priorities: The invention proposes four features to handle routing challenge on prioritization of packets. The first one is, the visual sensing node, namely the Camera Node and sensor node, should be able to specify priority to outgoing packets. In this way, image data for first pass may be sent at higher priority than data for subsequent passes as described in the previous paragraph. The second is, the intermediate or routing node should be aware of packet priority so that higher priority packets are forward before lower priority packets. The third is, if packets from two nodes collide, high priority packets should be retransmitted before low priority packets. Finally the fourth is, in the event of congestion, lower priority packets should be dropped before any high priority packet is dropped.

Routing method: The proposed invention routing method within the Intermediate Node has two important functions. The first one is the function of making sure the topology is up to date. This is achieved through advertising messages between nodes. Every node advertises periodically to its neighbor the number of hops to reach the Sink Node. Every Intermediate Node, periodically on receipt of the advertisement messages from neighbors, calculates the topology and the next hop information to reach the Sink Node in optimal number of hops. The second function is the transmitting and receiving the packets. On receipt of the packet from neighbor through its own forwarding layer, the Intermediate Node decides where to route the packet based on the routing table created. Based on the next hop information, the packet is transmitted, through its forwarding layer, to the proper neighboring node calculated based on routing table updates.

Forwarding layer: The proposed apparatus has forwarding layer innovation as well. The packets received from neighboring node, either an image data or an advertisement message; have to pass through forwarding layer. In wireless networks that use protocols such as CSMA/CD, it is also called as Media Access Layer (MAC Layer). In general MAC layer, when a packet is transmitted and collision occurs (i.e., another node tries to transmit in the same channel at the same time), then both nodes re-transmit after backing off random amount of time. The proposed invention modifies the traditional MAC layer protocol to handle the following packet priorities when the packets are received from the neighbor:

Higher priority packets are forwarded before lower priority packets

In case of collision, high priority packets are retransmitted before low priority packets In event of congestion, lower priority packets are dropped before any high priority packet is dropped Also, when the packet's next hop is decided based on the routing table update and on routing method described above, the packet is sent to forwarding layer to be sent to next hop based on the same three priority levels mentioned above.

Sink Node: The Sink Node has the routing method as well, where the Sink Node communicates through advertisement messages to its neighbor about its whereabouts. In addition, the Sink Node receives the image encoded packets from the Intermediate Node for processing. Major Sink Node constraints are the CPU power, energy and memory to complete the image processing so that all the packets that arrived may be processed in a timely fashion. The Sink Node processes the entire primary layer image that contains coarse information first before enhancing that image with secondary layers for details when there is enough processing power left.

Primary requirement of a wireless sensor network is to sense environment factors using low power, low cost sensors and route meaningful data to power rich Sink Node for processing. However, through the Camera Node where images are collected using sensors, they generate very large amounts of data to be exchanged between Camera Node and sink. For example, a raw RGB (Red Green Blue) image of 128×128 pixels with 24 bits per pixel, and 8 bits per color, will be 393,216 bits. This is magnitudes larger than sensor data.

To minimize size of image data, image compression techniques are used. Some image compression techniques suitable for this kind of compression are Discrete Cosine Transforms and Discrete Wavelet Transforms. Even with compression, the amount of data to be carried continuously from Camera Node to the Sink Node is very large. When the data is carried through Intermediate Node in mobile networks it may enter and exit at will, it becomes difficult to predict if there are enough capacity to handle all this data. In addition, partial receipt of packets of compressed image by Sink Node will not enable Sink Node to resurrect the entire image leading to wastage.

A category of image compression algorithm at Camera Node and Sink Node that generates multiple layers of compressed image data is used by the proposed apparatus. The first layer contains most prominent features of the image though coarse. The second pass of the algorithm provides a subsequent layer consisting of details of the image. If the Sink Node receives the image data required for first pass it starts processing without waiting for subsequent layers, so that it has coarse level image to start with. When there is enough processing time available, subsequent pass is done to enhance the image thus reducing the system response time.

Routing Module: Routing module present in every node in the visual sensor network provides the method to route packets between Camera Node, Intermediate Node and Sink Node.

Figure 4:
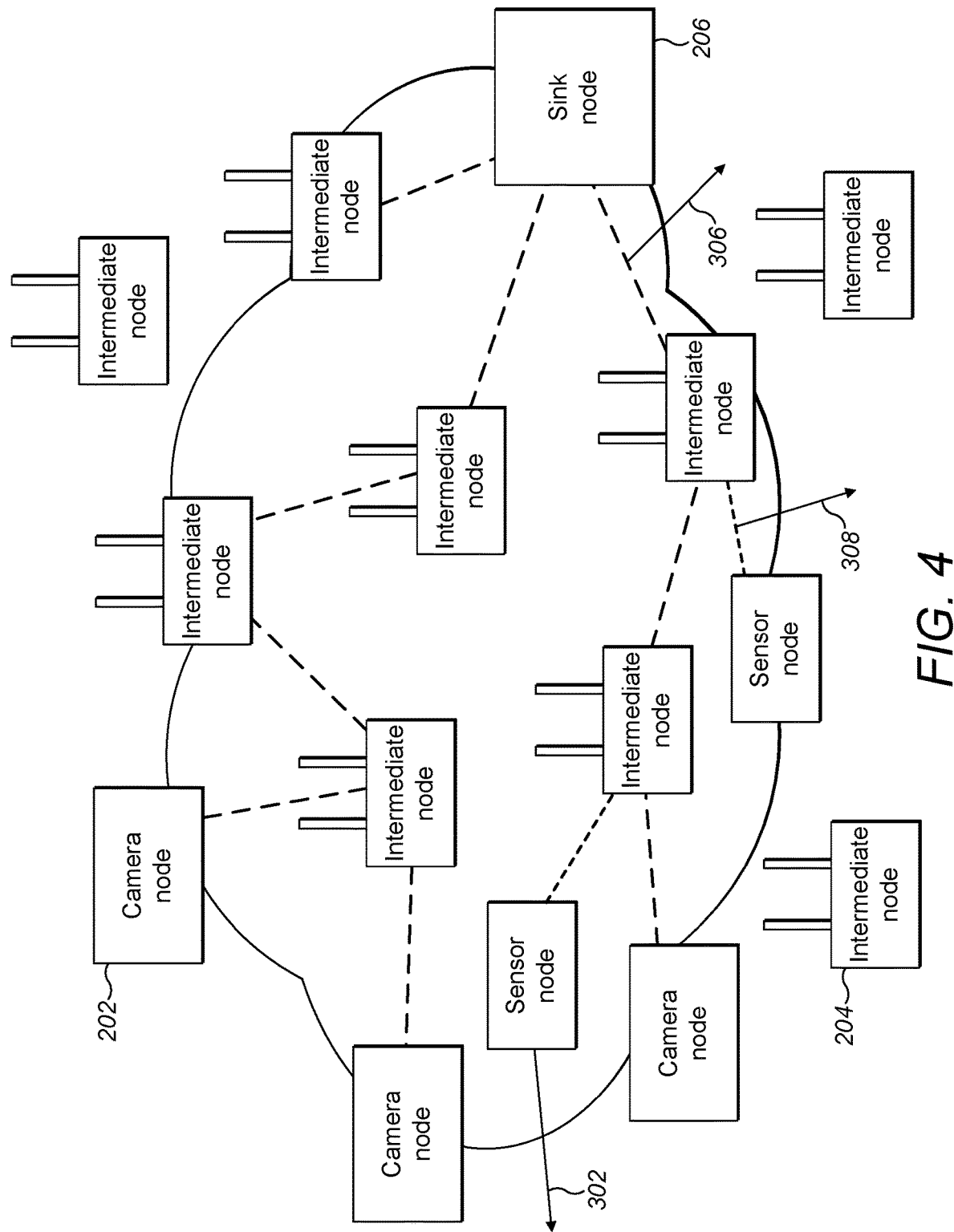
FIG. 4 shows the optimized topology of the wireless sensor ad-hoc network. It may be seen that the topology shown in FIG. 4 is a subset of the topology shown in FIG. 3. The network topology in FIG. 4 shows only those links that are used by the Camera Node to transfer the visual data through Intermediate Node to reach the Sink Node.

FIG. 4 shows the optimized topology of the wireless sensor ad-hoc network. It may be seen that the topology shown in FIG. 4 is a subset of the topology shown in FIG. 3. The network topology in FIG. 4 shows only those links that are used by the Camera Node to transfer the media data through Intermediate Node to reach the Sink Node (For example, 306 and 308). We can see that 304 is not part of the optimal path and hence is not part of the topology in FIG. 4. The links in the topology are derived using the routing methodology that is part of the invention 1604.

Ad Hoc wireless network: A wireless network is an Ad Hoc wireless network if the node is autonomous and has a routing module present in it. The node in Ad Hoc wireless network is connected as peer to peer routing elements. The node have complete independence to decide where to receive the packets from and where to transmit next based on the rules and intelligence within the routing module derived based on constraints.

Figure 5:
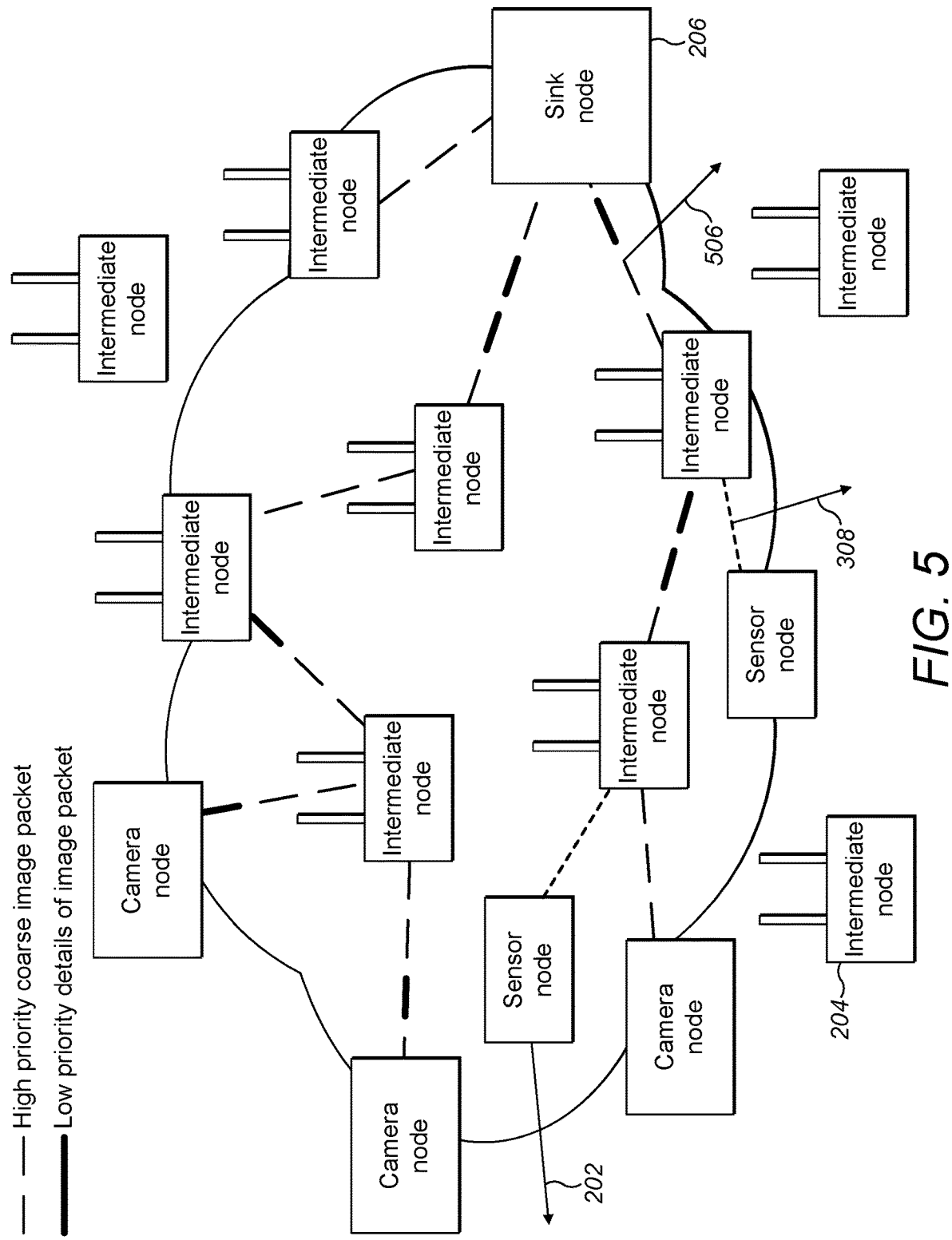
FIG. 5 shows the high and low priority image packet data path between various nodes showing traffic prioritization.

The data links shown in FIG. 5 is a depiction of how the image encoding is done using the image encoding module at the Camera Node. The first level of the decomposition of the image retains the most prominent feature of the image. This is shown in dotted lines 506 that are tagged as high priority. The other levels provide the remaining details of the image which is depicted in dark line and tagged as low priority.

Figure 6:
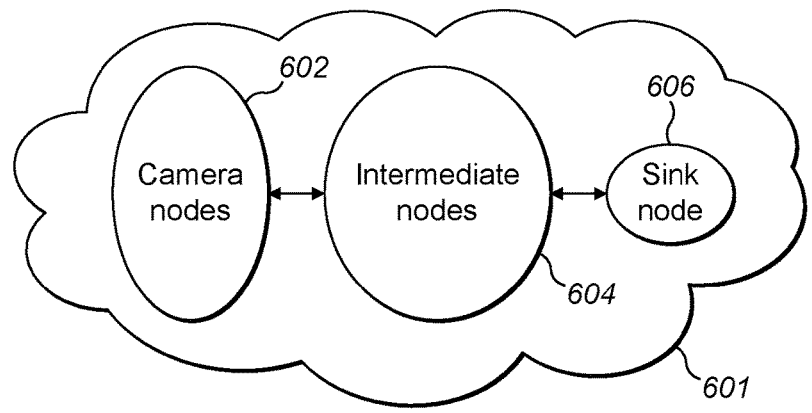
FIG. 6 shows the network node classification as a high level decomposition of the network.

The network may be grouped as shown in FIG. 6 as Camera Node 602, Intermediate Node 604 and Sink Node 606 shown in cloud 601. Any node joining the network or leaving the network will fall into one of the three groups.

Mobility: A wireless network supports mobility if some of the autonomous node within the network is mobile.

Routing Module in Ad Hoc mobile networks: Routing module in Ad Hoc mobile wireless networks present in every node within the network provides the method to route the packet between Camera Nodes, Intermediate Node and Sink Node, where some of these are mobile. The routing module has the latest snapshot of where to route packets based on the topology at that given moment. The topology periodically changes within an Ad Hoc mobile network as the autonomous node may become part of the network and go out as they are mobile.

The Network model to carry traffic between Visual Sensing Node, namely Camera Node to the Sink Node consists of various Intermediate Nodes to go through. In a Mobile Ad Hoc network, to carry the packets of all images captured by all Camera Nodes is extremely difficult when Intermediate Nodes are constantly moving in and out of the network. Therefore, this invention optimizes the end to end network performance of carrying image data from Camera Node to the Sink Node in such a way that continuity of images exist after processing by Sink Node, by maximizing and prioritizing packets that contain coarse level details that are available through first pass of image encoding. Therefore this invention maximizes the usefulness of the images obtained by Cameras by prioritizing the coarse level pictures all the way through the network.

Constraints: Constraints are parameters that are optimized in the routing method to derive a topology map on where the node receives packets from and where the packets need to be transmitted next. For data delivery in the Intermediate Node of visual sensor network, the communication is constrained by many stringent Quality of Service (QoS) requirements such as delay, jitter and data reliability. Similarly, the sensor access node of the network are constrained by energy used CPU power and memory. The Camera Node is constrained by the image compression methodology so that the information contained in compressed image is consistent, valid and useful.

To optimize the usefulness of the image captured, every Intermediate Node that joins the network needs to apply the priority of carrying the coarse level image at higher priority. The invention makes sure that such a rule is applied in both MAC layer and Routing layer of the Intermediate Node. Most of the nodes in the Visual Sensing Network is Intermediate Nodes. When the network is deployed, the Intermediate Node creates routing tables that are necessary to take routing decision when packets are received.

Figure 7:
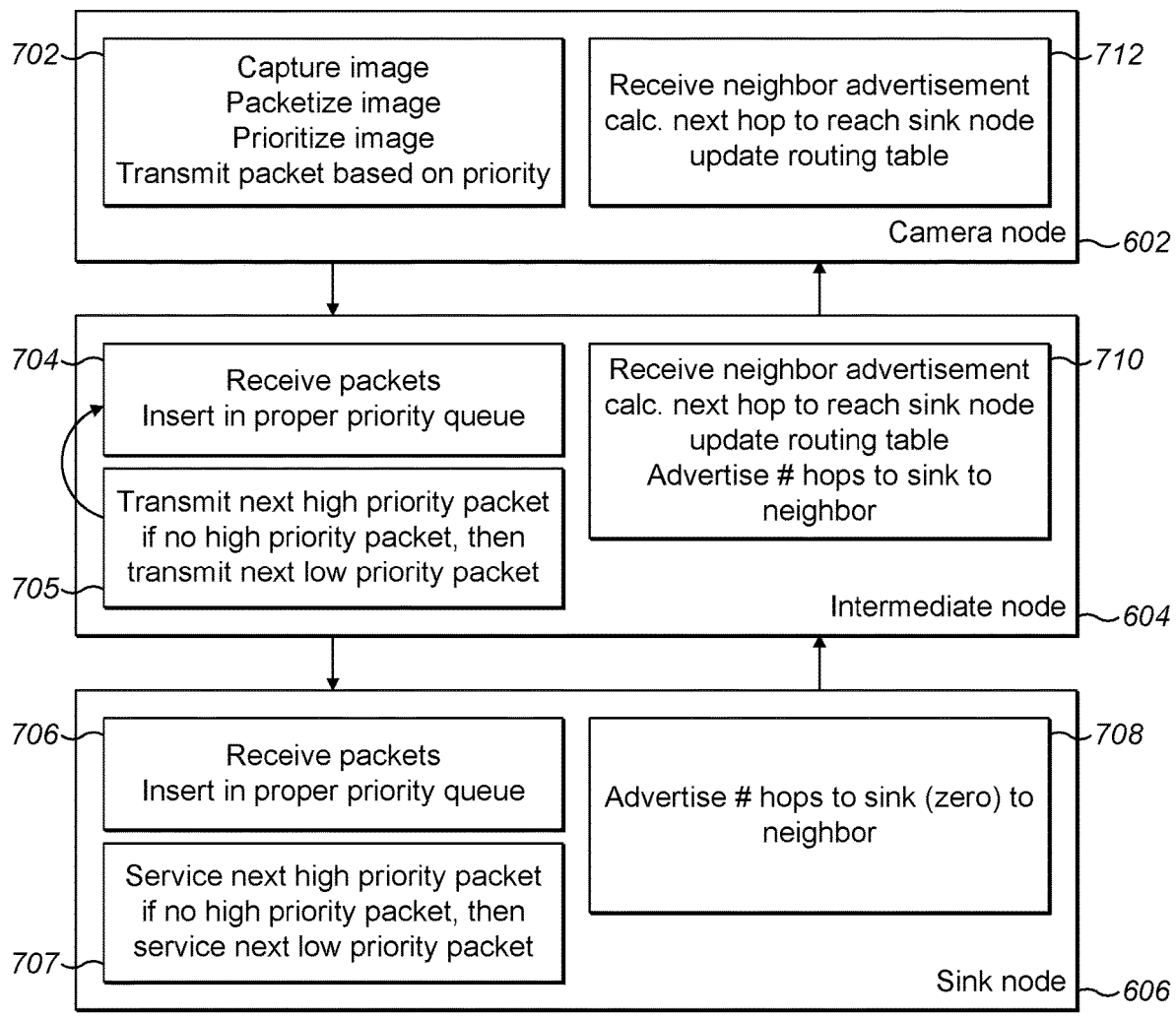
FIG. 7 shows the network element dependency and communication between the different nodes.

The communication between the groups, shown in FIG. 7 involve transmit function and receive function between nodes. The Camera Node capture, packetize and prioritize the image 702 before transmitting it based on priority to the next hop (Intermediate Node 604). The Intermediate Node receives the packet 704 as per priority and services the queue and transmits to the next hop as per routing table. It also transmits the next high priority packet if no high priority packet, then transmit next low priority packet (705). Finally, the Sink Node receives the packet 706 and services the packets from high priority queues before servicing the low priority queue (707) thus guaranteeing at least a coarse level continuous image before getting detailed images when time is available.

In order to form the topology correctly, the Sink Node advertises to its connected Intermediate Node that it is directly reachable 708. Based on that, the Intermediate Node advertises 710 to their connected Intermediate Node the number of hops it takes to reach the Sink Node. In addition, the Intermediate Node updates the routing table and the topology. The Camera Node receives the information 712 ultimately from its neighboring Intermediate Node on the number of hops its neighbor takes to reach the Sink Node. Camera Node selects the Intermediate Node that provides the shortest path to reach the Sink Node and updates its topology map and routing table. FIG. 6 shows the communication between groups whereas FIG. 7 shows the communication between individual nodes within the group.

Figure 8:
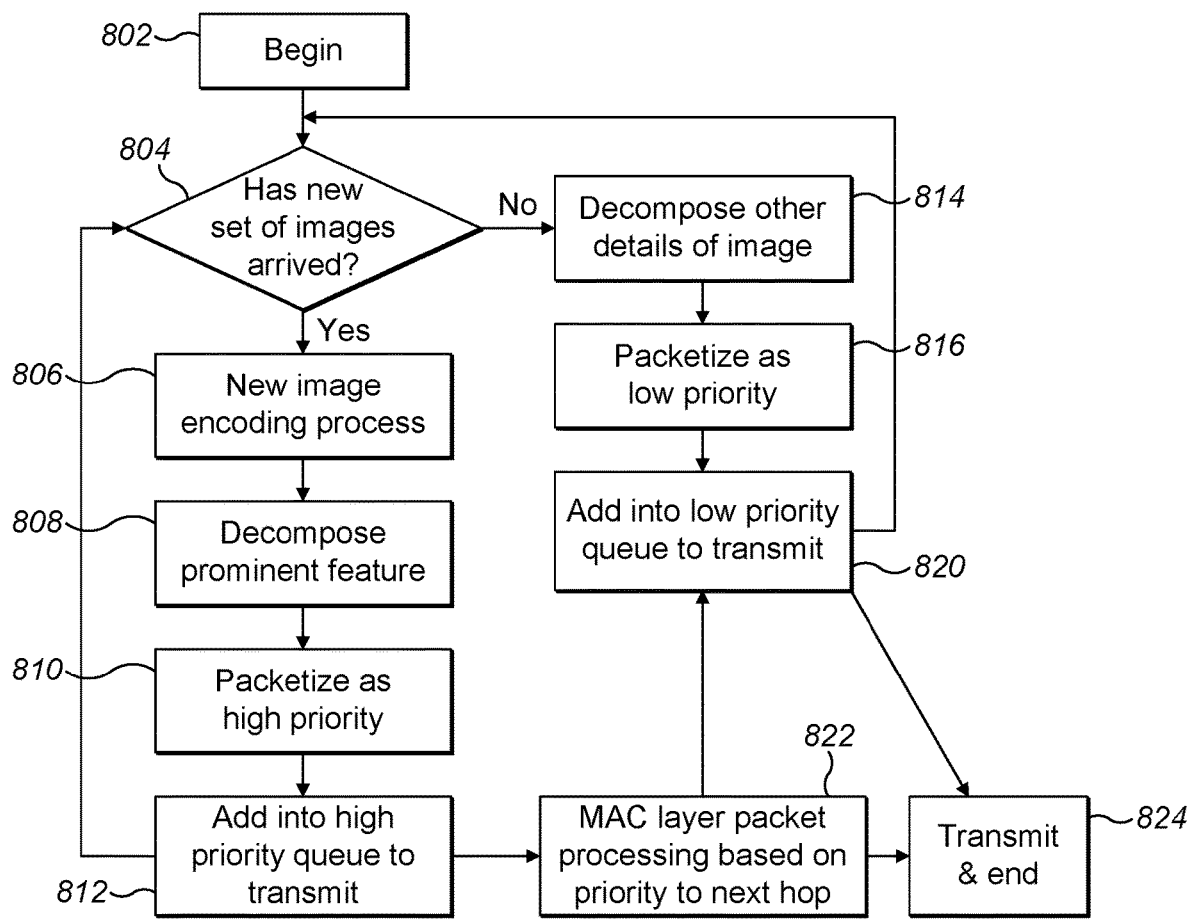
FIG. 8 depicts the flow chart of the image processing steps in the Camera Node.

The Image Capturing Module interfaces with the camera to capture the image. The image encoding module depicted in the flowchart is used by the Camera Node to decompose the captured image into multiple layers of images. The first pass consists of coarse details of the image, while the second pass consists of decomposing further details of the image. The first pass always gets higher priority over the second pass. It may be seen in the decision step 804, that when the new image arrives, new image encoding process starts 806 and then decomposing the coarse image containing the prominent features 808 takes place. Once the decomposition is done, the coarse image is packetized 810 and put in high priority queue 812 for MAC layer packet processing 822 to happen. If there is no new image arrival, the Camera Node is busy decomposing details of images 814 whose prominent features have already been extracted and packetized. The decomposed details are packetized 816 and added into low priority queue for transmission 820. The MAC layer picks up the low priority queue for transmission based on the priority 822. This method is optimal, as after every stage in processing low priority packets, namely 814, 816 and 820, the decision box 804 is checked for new images, thus processing high priority coarse image as soon as they have arrived without compromising the atomicity of 814, 816 and 820. This maximizes the high priority packet transmission and processor utilization as maximum amount of time is spent processing a high priority packet which is an important piece of this invention. Therefore, FIG. 8 depicts the flow chart of the image processing steps in the Camera Node.

Figure 9:
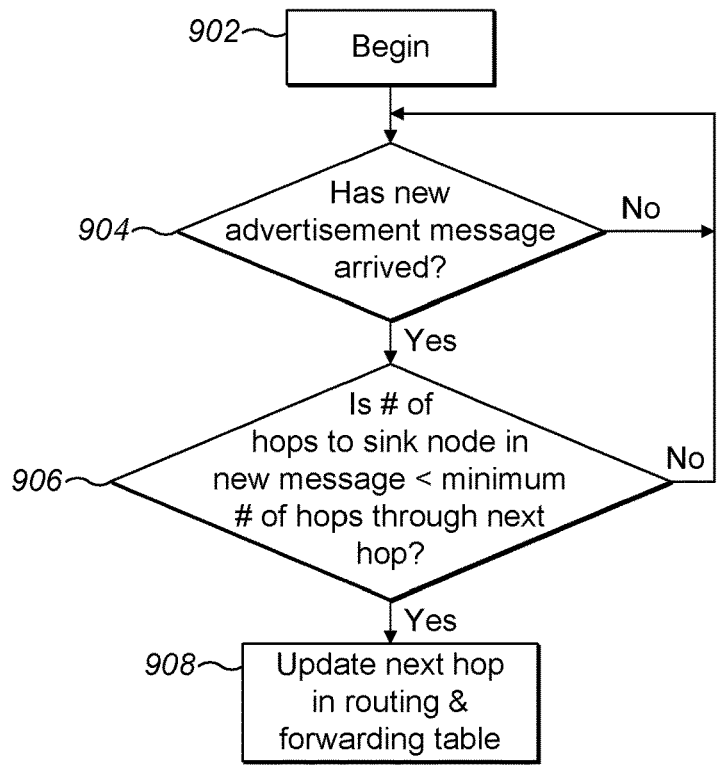
FIG. 9 shows the steps taken within Camera Node to complete a routing update.

In order to send the data, the next hop needs to be known. The knowledge of the next hop is determined using the control path routing update 902. FIG. 9 shows the steps taken within Camera Node to complete a routing update. Neighboring Intermediate Node that can communicate with Camera Node sends advertisement messages periodically to ascertain their connectivity. The advertisement message has the information on the number of hops it takes to reach the Sink Node from the Intermediate Node. On receipt of such an advertisement message 904, Camera Node calculate if the Intermediate Node that sent the advertisement provides the shortest number of hops to reach a Sink Node 906. If it does, then the routing table and forwarding table is updated 908 to make that Intermediate Node as the next hop.

Figure 10:
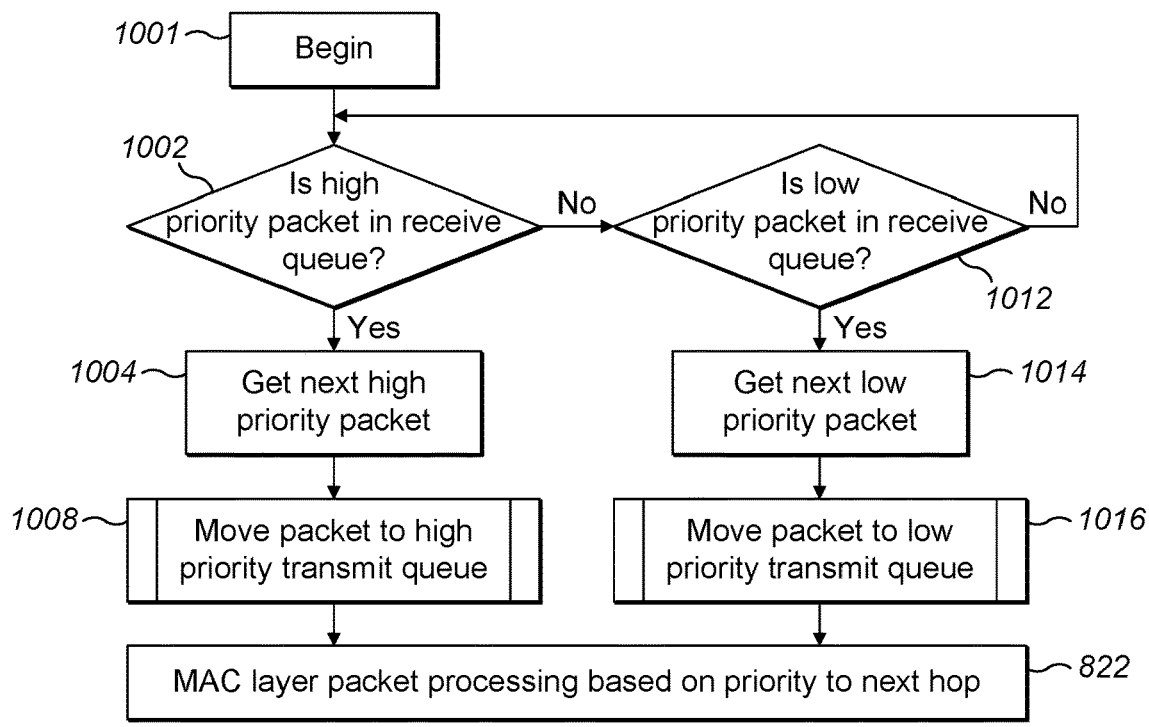
FIG. 10 shows the data path packet processing in the Intermediate Node.

Similarly, in the Intermediate Node when a high priority packet is received in the queue 1002, the packet is de queued 1004 and moved to transmission immediately 1008 where the MAC layer may process the packet and send to next hop 822. If there are no high priority packets in the queue, and if there are low priority packets 1012, then those packets are de queued 1014 and moved to low priority transmit queue 1016 where the MAC layer may process low priority packets and send to next hop based on the available time 822. The packet processing is optimal towards servicing maximum number of high priority packets, as low priority packets are serviced only when there are no high priority packets in queue—an important distinction of the invention. Therefore, FIG. 10 shows the data path packet processing in the Intermediate Node.

Figure 11:
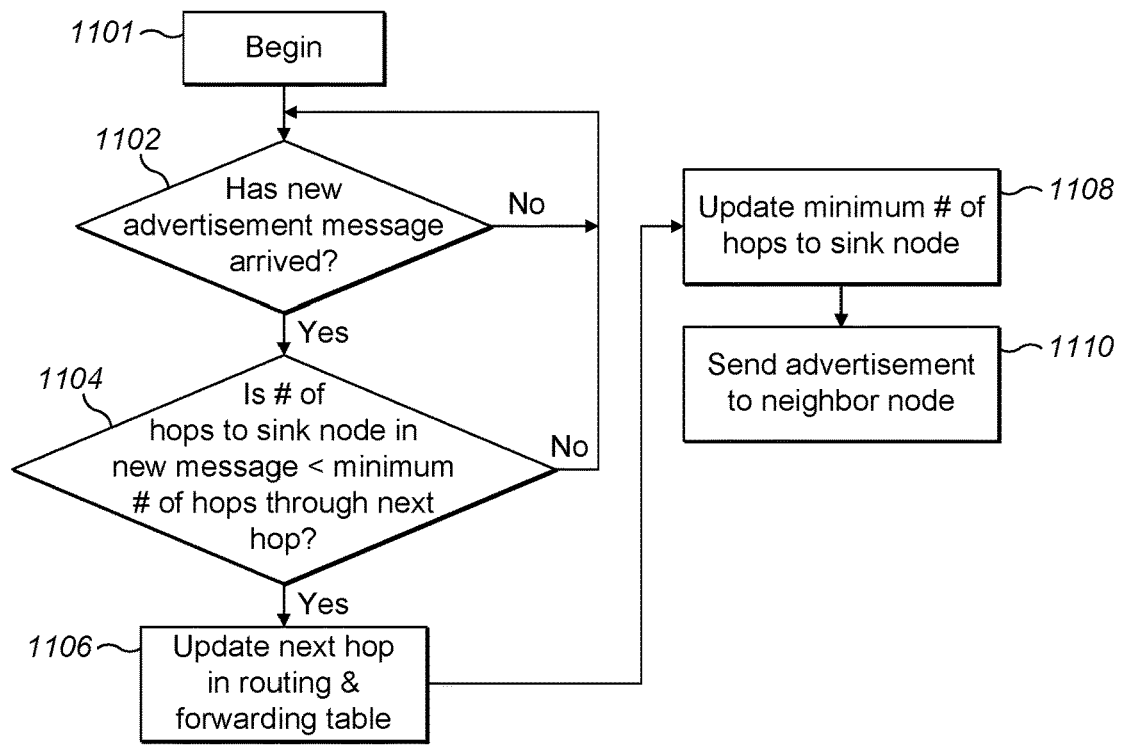
FIG. 11 shows the control path routing update message processing engine in the Intermediate Node.

The data cannot move unless the next hop information is available. This is done using the control path update 1101. FIG. 11 shows the control path routing update message processing engine. When a new advertisement message arrives from the neighboring node 1102 with the information of number of hops it takes to reach the Sink Node, the engine checks if that neighboring node provides the path to reach the Sink Node with minimum number of hops 1104. This is done by comparing other messages the Intermediate Node has received from all other neighbors thus far. If the received message from neighbor provides the least number of hops to reach the Sink Node, then the routing table and forwarding table is updated 1106. Now that the Intermediate Node has found the shortest path to reach the Sink Node it updates its local database on the number of hops to reach the Sink Node through it (by adding one hop, i.e., through it) 1108, and advertises that information to its entire neighborhood 1110. This allows the neighboring nodes to know the shortest path to reach the Sink Node.

To achieve their primary task of routing image data from Camera Node to the Sink Node, the routing tables in Intermediate Node are updated throughout the lifetime of the network as some nodes may die due to depleted power or other environmental conditions, while other nodes may be added to the network when required. The routing framework makes sure that Intermediate Node forward high priority packets (first pass image layer) faster than low priority packets (second pass image layer). This enables Sink Node to reconstruct coarse image of the end to end transfers first while working on second pass to enhance the image details when processing time is available.

The invention achieves the optimality in reproducing useful image at Sink Node by using packet prioritization in all the three layers of network architecture within Camera Node, Intermediate Node and Sink Node. The layers are Application Interface Layer, Routing layer and Medium Access and Control (MAC) layer.

Figure 12:
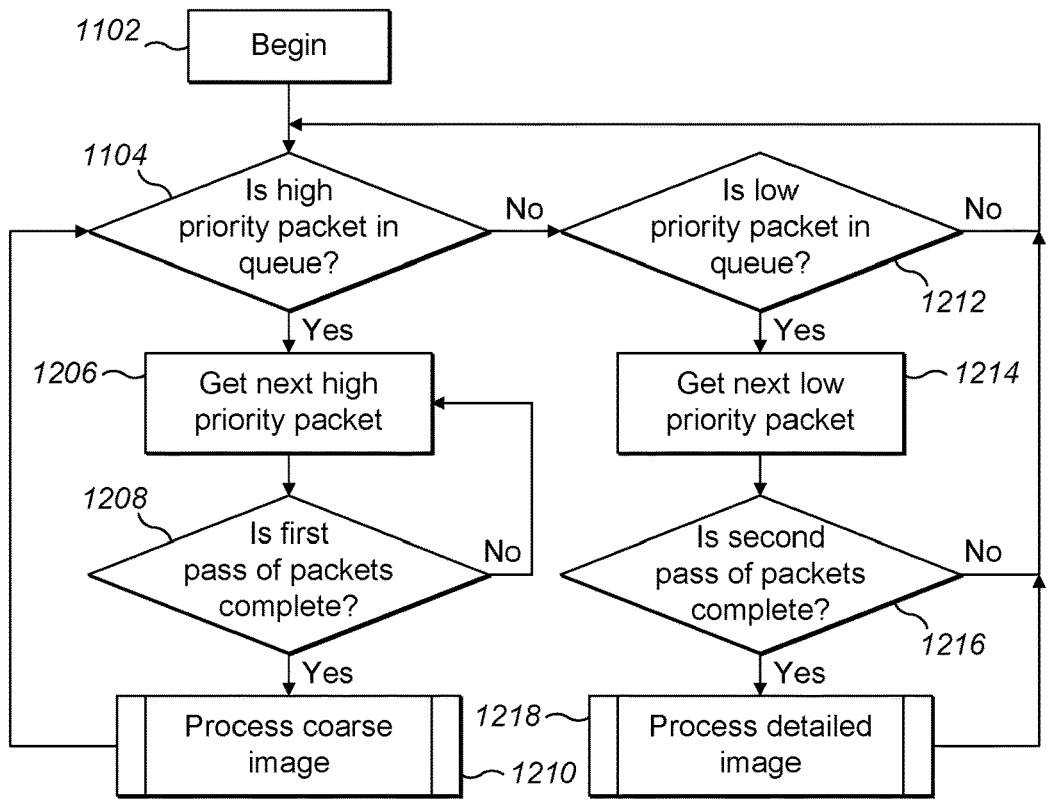
FIG. 12 shows the data path packet processing in Sink Node. Image packets finally reach the Sink Node from Camera Node through Intermediate Node.

FIG. 12 shows the data path packet processing in Sink Node. Image packets finally reach the Sink Node from Camera Node through Intermediate Node. When the packet arrives, the decision box 1104 checks if the packet is of high priority (containing coarse image data). If it is, then the packets are removed for processing 1206 until the full coarse image first pass may be completed 1208. Once enough information to process coarse image is obtained, image processing is started 1210. If no high priority packet is in queue, but a low priority packet is in queue 1212, then the Sink Node processes provided there is no high priority packet is left to be processed. The low priority packets are processed to obtain the details of the images 1214, 1216 and 1218 as long as no high priority packets are in queue. The processed coarse images give the necessary portion of images, while details provide additional information that is good to have.

Figure 13:
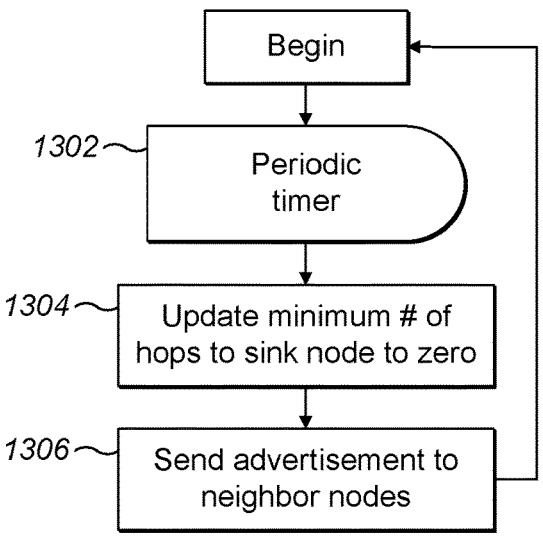
FIG. 13 shows the Sink Node routing update.

In addition, Sink Node needs to complete the control path routing update. FIG. 13 shows the control path routing update in Sink Node. Sink Node periodically 1302 advertises minimum number of hops information 1304 to the entire neighboring nodes 1306. The entire neighboring nodes now knows that they may reach the Sink Node in one hop, which they then advertise to their neighbors.

Figure 14:
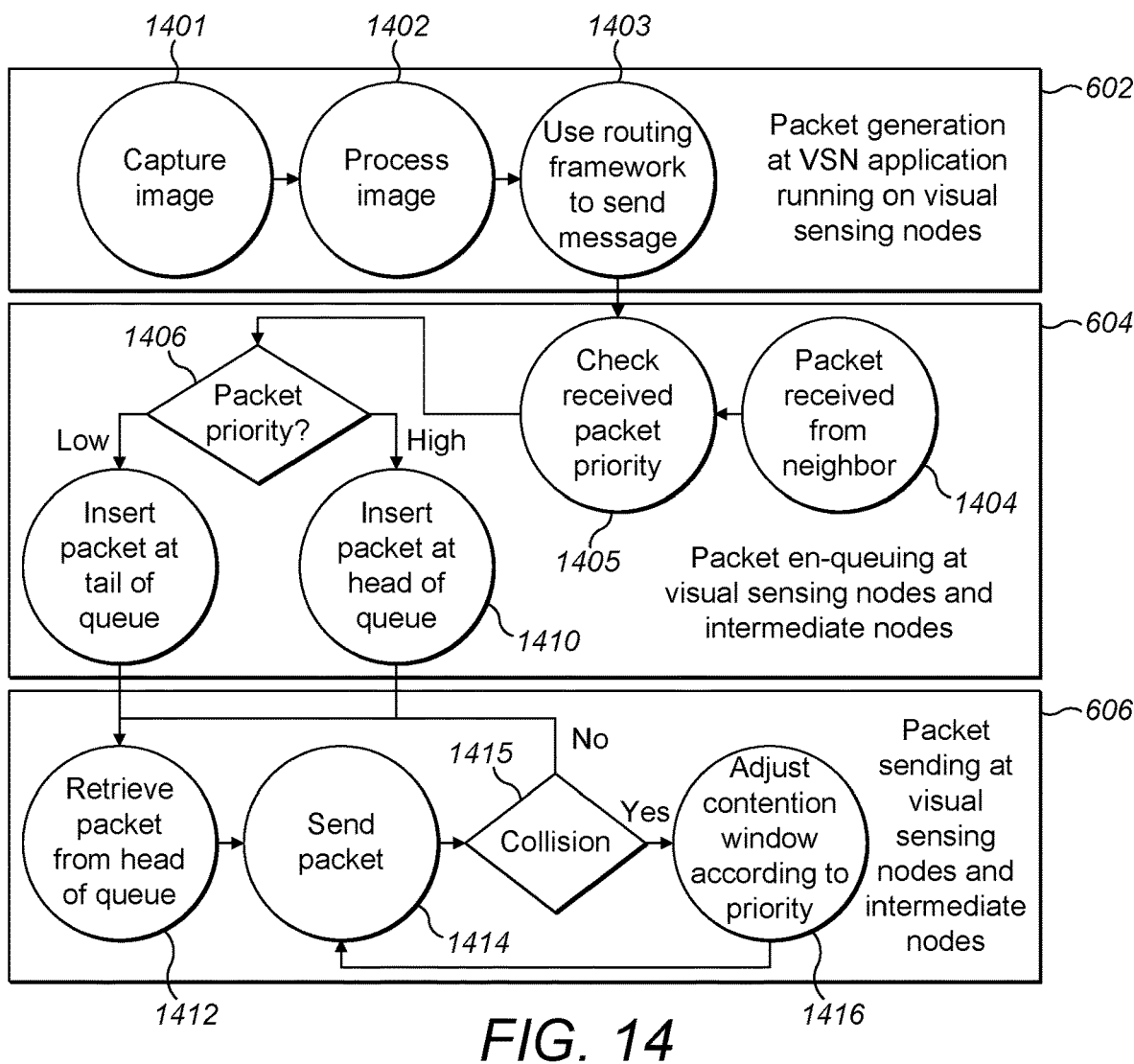
FIG. 14 shows the flow chart of the end to end apparatus from capturing the image by a Camera sensor node to the receipt of that image by the Sink Node.

FIG. 14 shows the Routing Framework Data Flowchart. The flowchart consists of three portions. The first portion 602 deals with the packet generation at the visual sensor network application that runs in the visual sensing nodes. The sensing node, namely the Camera node 202, captures the image 1401, processes the image 1402 and uses the routing framework within the node to send the image 1403 to the second portion 604. The second portion 604 completes the packet en-queuing at the visual sensing nodes 202 and intermediate nodes 204. When the packet is received from the routing framework 1403, the packet priority is checked 1405 and a decision is made 1406 by inserting at the tail of the queue if low priority and head of the queue if high priority 1410. In case the packet is received from the neighbor 1404 instead of the visual sensing nodes, the same procedure is followed by forwarding the packets to check priority 1405. After prioritization of the packets is completed in second portion 604, packets are sent to the forwarding layer 606, where packets are forwarded. The procedure is same for visual sensing nodes and intermediate nodes. The prioritized packets are received from the head of the queue 1412 and forwarded through the driver queue 1414. If a collision occurs 1415, contention window is adjusted according to the priority 1416, if not the packet is sent and the next packet is retrieved for sending.

In the Application Interface Layer, proposed invention introduces a set of primitives. In Camera Node, the Application Interface Layer fragments image data, packetizes the data and sends the packet with appropriate priority to the Routing layer. In the Sink Node, the Application Interface layer receives the packets and reassembles the packets into images as per the priority.

In the Routing layer, proposed invention sends and receives advertisements from its neighbors declaring identities and the number of hops they are from Sink Node. These advertisements are sent periodically so that the topology is up to date. Based on the topology, the next hop information is gathered so that any packet that is received may be sent towards the Sink Node using the next hop. Up to date topology is important as nodes in Ad Hoc network enter and exit the network.

Once the network has been established, Routing layer is ready to transport image data from Camera Node to the Sink Node. When the Camera Node application has image data to send, it uses primitives provided by the Application Layer as described in previous paragraphs. The Network Layer selects the next hop towards the sink that is selected by the Camera Node from its routing table. If the Sink Node address as specified by the Camera Node is not in the routing table, the packet is dropped. A neighbor's entry keep-alive watchdog is reset whenever a packet is received from that neighbor. If a packet is not received from a neighbor within a threshold, the neighbor's entry is deleted from the routing table. In this way, routing tables are maintained during data transmission phase In the MAC layer, the routing framework works at two levels. The first is the intra-node level where the routing framework makes sure that high priority packets are forwarded before low priority packets. The second level is the inter-node level where the routing framework makes sure that when two neighbors contest for transmission medium, the neighbor with high priority packet gets a chance to transmit its packet before the neighbor with low priority packet.

Queue Insertion happens in MAC layer when a packet arrives for transmission. If MAC layer is busy, the packet is placed in a queue where it waits for its turn. The proposed invention with modified priority-based routing framework makes use of this queue. When a packet with high priority arrives, it is placed at the head of the queue. If a packet of low priority arrives, it is placed at the tail of the queue thus ensuring at intra-node level packet priority is maintained for transmission.

Differentiated back-off Window in MAC layer is another important feature as part of the proposed invention, where two node when transmitting at same time end up with collision. In regular CSMA/CD based protocol, both nodes back off for a randomly selected time slot from a pseudo-fixed-size window. If they collide again, the window size is increased exponentially to a certain size. In the proposed invention, the priority-based routing framework maintains different windows for the different priorities. When a collision occurs, the MAC layer checks the priority of packet that collided and determines back-off times from different windows. For high priority packet, in the proposed invention, the window is smaller than for a low priority packet. In this way, the node with high priority packet gets a chance to transmit its packet within a smaller window than a node with a low priority packet making sure that at the inter-node level, high priority packets transmit sooner than low priority packets.

At the Sink Node, the MAC layer processes all the high priority packets so that at least coarse level images of continuous streams are created first to have a viable end-to-end Camera Node data, thus optimizing the usefulness of the image data stream that was collected, thus achieving the goal of the invention.

The invention has been implemented using Contiki OS and RIME protocol stack by modifying the Routing and MAC layers.

Figure 15:
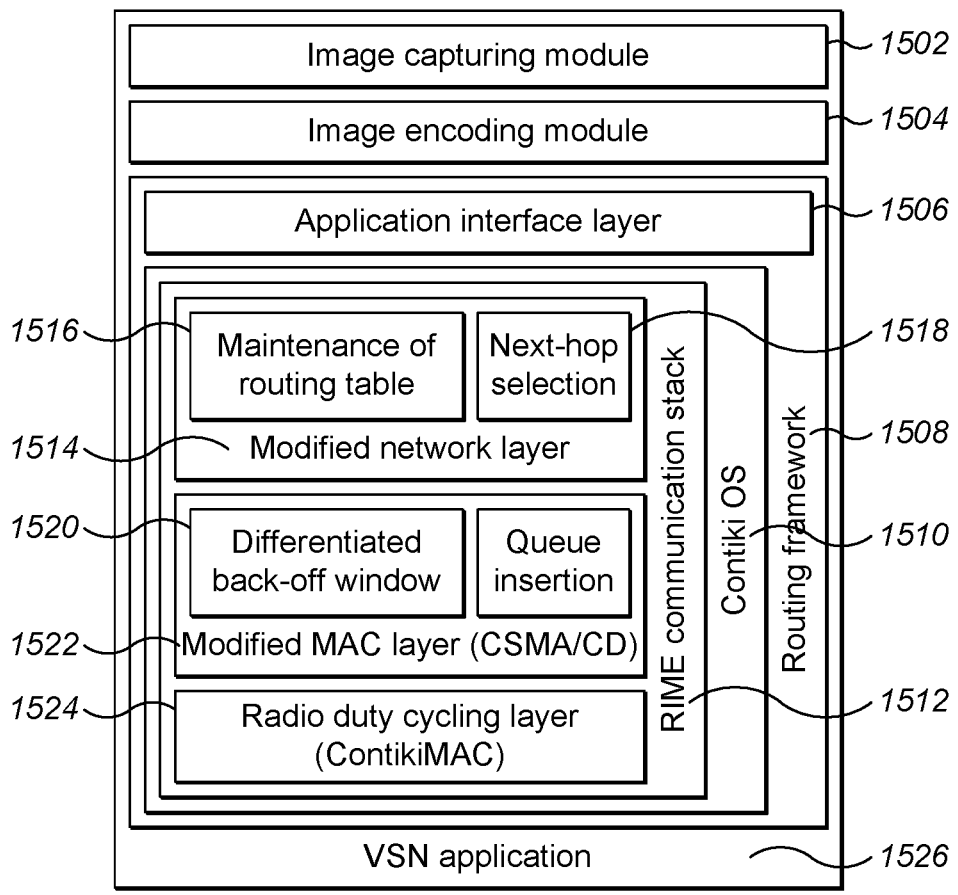
FIG. 15 shows the framework components within a virtual sensor network framework.

To achieve the reprioritization and the next hop selection, the network layer has to be modified. FIG. 15 shows the framework components within a visual sensor network. The entire VSN application 1526 consists of the Routing framework 1508, Image encoding module 1504 and the Image capturing module 1502. Image capturing module 1502 interfaces with the camera to capture pictures. Image encoding module 1504 encodes the captured image. Routing framework 1508 handles the packetization and routing of the captured image. The Routing framework 1508 consists of the Application interface layer 1506 and the Contiki Operating system 1510. The Application interface layer 1506 receives the encoded image packets to be routed through the shortest path to the sink node. It allows to the application to fragment image data into packets, specify priority and send them. Similarly, it has the capability to receive such packets from neighboring node and assemble them at the sink to regenerate the image. Contiki Operating system 1510 communicates with the networking layer and lower layers through RIME communication stack 1512. The RIME communication stack interfaces with the Modified network layer 1514, Modified MAC layer 1522 and the Radio duty cycling layer 1524. The modified network layer 1514 shows the routing table maintenance component 1516 and the next-hop selection 1518 modules. In Intermediate Node, the advertisement messages are used to calculate the latest topology and maintain the routing table in the modified network layer 1514. This table is used to select the next hop 1518. The Figure also shows the modified MAC layer 1522 functionality where the Differentiated Back-off window 1520 is modified to accomplish priority. Similarly the Queue Insertion procedure finds the right place for the packet in queue based on its priority.

Figure 16:
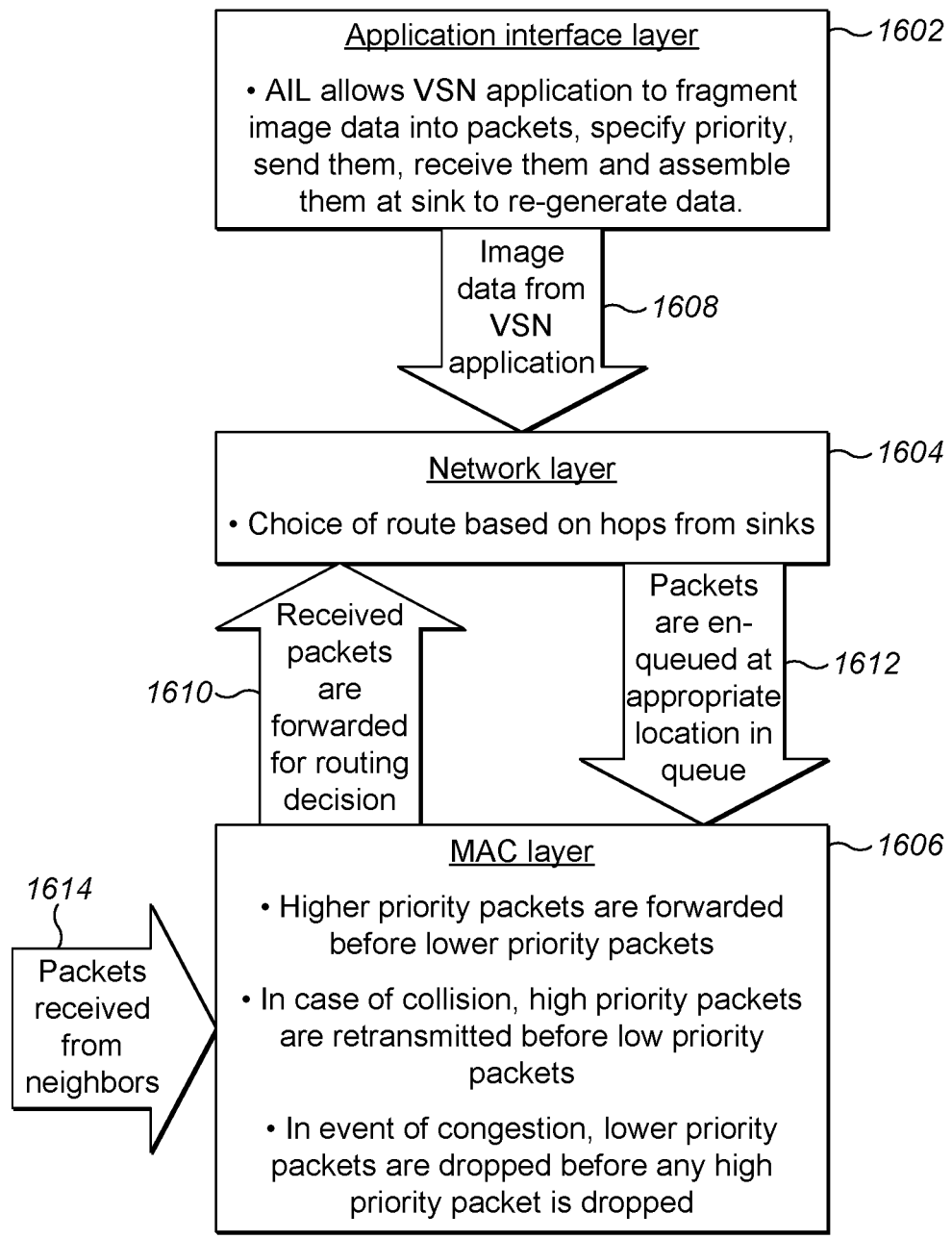
FIG. 16 illustrates the MAC layer priorities in Camera Node and Intermediate Node.

Similarly, packet prioritization is done at MAC layer, Network layer and Application interface layers to handle the differentiation of packet handling. FIG. 16 illustrates the MAC layer priorities in Camera Node and Intermediate Node. The top level shows the Application Interface Layer 1602 that allows application in Camera Node to fragment image data into packets, specify priority and transfer them to 1608. Also, the application layer in Sink Node that receives the fragmented images processes and reassembles them. The figure also shows the network layer 1604 that advertises messages, updates topology, and provides the next hop information. The network layer receives packet from neighboring node 1614 through its own forwarding layer 1610. The network layer also queues the packets to be transferred to the neighboring node through its own MAC layer 1612. The MAC Layer 1606 prioritizes the queued packets, handles collision during transfer and makes decision when congestion occurs.

Accordingly, the specification and drawings are to be regarded in an illustrative rather than a restrictive sense. The invention is valid for general wireless network with multiple Sink Nodes as well where end to end packet performance is to be optimized and packets may be prioritized in such a way partial results give a general idea to move the agenda forward.

What is claimed is:

1. A method of using a visual sensor network, comprising:
   procuring an image using a Camera Node as a captured image; wherein the Camera Node may be present in wireless Ad Hoc network, mobile and wireless sensor network;
   layering and compressing the captured image into a most prominent to a least prominent feature data;
   performing several passes to create a layered encoded image on the most prominent featured data and creating a first pass coarse encoded image as a high priority image and a secondary pass coarse encoded image as a low priority image;
   packetizing and prioritizing the most prominent to the least prominent feature data of the first pass coarse encoded image and the secondary pass coarse encoded image to be passed on to an Intermediate Node
   optimizing the usefulness of the first pass coarse encoded image and the secondary pass coarse encoded image from the Camera Node using the Intermediate Node; and
   performing several passes to create a layered encoded image on the procured image by carrying most useful a first pass coarse encoded image as a high priority image, through an Intermediate Node to a Sink Node for processing.

2. The method of claim 1, further comprising; receiving the first pass coarse encoded image and the secondary pass coarse encoded image from the Camera Node in the Intermediate Node; inserting a queue for the high priority image to low priority image to be transmitted to the Sink Node; receiving an advertisement calculation for a next hop to reach the Sink Node; advertising a number of hops to the Sink Node to a neighbor Sink Node, Camera Node and Intermediate Node; and updating a routing table for routing the first pass coarse encoded image and the secondary pass coarse encoded image to the Sink Node.

3. The method of claim 2, further comprising:
   processing the first pass coarse encoded image at the Sink Node to process the Camera images that reached as high priority to establish minimum needed continuity of a visual data that the Camera Node had captured; and
   processing the second pass coarse encoded data of lower priority to enhance the details of already processed the first pass coarse encoded image.

4. The method of claim 2, further comprising:
   updating the advertisement calculation for the next hop to reach the neighbor Sink Node, Camera Node and Intermediate Node to update a topology.

5. The method of claim 4, further comprising:
   continuously monitoring a neighbors' entry through a keep-alive watchdog timer and update the topology accordingly.

6. The method of claim 2, further comprising:
   forwarding the data packet during a normal period, during collision and during congestion.

7. The method of claim 6, further comprising:
   creating a differentiated back-off window for the colliding image packet and prioritizing the high priority to pass before the low priority image packet from the Camera Node through the intermediate to the Sink Node using a media access layer software residing in the hardware.

8. The method of claim 7, wherein the media access layer performs a new differentiated back-off window method that handles packet transmission in the media access layer during collision based on priorities unlike a CSMA/CD protocol that handles based on random time slot selection.

* * * * *